UNITED STATES PATENT OFFICE.

THOMAS WM. CAPPON, OF BROOKLYN, NEW YORK.

PROCESS OF PRODUCING HYDROFLUOSILICIC ACID.

SPECIFICATION forming part of Letters Patent No. 461,665, dated October 20, 1891.

Application filed May 5, 1891. Serial No. 391,683. (No specimens.)

*To all whom it may concern:*

Be it known that I, THOMAS WM. CAPPON, a subject of the Queen of Great Britain, residing at Brooklyn, in the county of Kings and State of New York, have invented certain new and useful Improvements in Processes of Producing Hydrofluosilicic Acid, of which the following is a specification.

This invention pertains to a new and improved process of producing hydrofluosilicic acid, whereby a stronger and purer acid is produced and one that can be transported in glass or earthenware bottles without detriment to the latter.

The object of my invention is to produce hydrofluosilicic acid of such degree of concentration and purity as has not been attainable by any of the methods now in use. The old process consisted in distilling a mixture of equal parts of pulverized fluor-spar and silica with twice their weight of sulphuric acid in an iron retort with a leaden tube dipping into water contained in the receiver, whereby silicon fluoride is set free and comes over, but in passing into the solution is decomposed into hydrofluosilicic acid and silica, which separates as a light flocculent precipitate. The reaction which takes place is expressed by the following equation: $3SiF_4 + 2H_2O = SiO_2 + 2H_2SiF_6$. As the distillation went on this gelatinous mass would accumulate in the delivery-tube of the still and choke it, thus incurring the risk of explosion. This is prevented to some extent in the older process by letting the end of the tube dip into a small vessel of mercury placed at the bottom of the receiver. As the distillation proceeds this jelly accumulates in the interior until the gas can hardly force its way through it or escapes from the semi-solid mass unacted upon, which generally happens when the solution contains about ten per cent. of acid, or probably not as much. The acid is then pressed out on a filter by squeezing the silica and the latter remains.

I produce the hydrofluosilicic acid by passing fluoride of silicon into an aqueous solution containing free hydrofluoric acid, (HF,) the relative quantity of which may be varied from ten to twenty per cent., or even more, according to the strength it is desired the resultant acid should possess. The silica ($SiO_2$) which forms by contact with the water, instead of accumulating and obstructing the action and choking the distilling-tube, is dissolved as fast as it forms, and by dissolving forms a fresh addition of hydrofluosilicic acid. The process continues until all the free fluoric acid in the solution is converted into fluosilicic acid, which will occur when the silica which forms or collects on the surface is slightly in excess, say, to the extent of about the depth of one inch. When the silica begins to thus collect on the surface of the solution, it is apparent that all the free fluorine has been converted into fluosilicic acid, and the solution, together with the silica, is siphoned off and collected into glass bottles or other suitable vessels, and the receiver is then recharged with water and free fluoric acid, and the process continues, as before, until the supply of gas ($SiF_4$) is exhausted. This resultant acid, while possessing greater strength and purity than the acid as heretofore produced, can be conveyed in glass or earthenware bottles without danger of attacking and destroying such bottles, as has heretofore been the case.

The fluoride of silicon is made in the usual way by acting on a mixture of equal parts of pulverized fluoride of calcium and pulverized silica with concentrated sulphuric acid.

The silica as it separates is dissolved by hydrofluoric acid (HF) introduced for that purpose into the liquid, thus not only removing a dangerous obstruction, but in the act of dissolving it makes by its union with hydrofluoric acid (HF) the very acid sought to be produced ($2SiF_4 + 4HF = 2H_2SiF_6$) and leaves the solution quite fluid and in a condition to combine with fresh additions of silicon fluoride and form further amounts of hydrofluosilicic acid until an extraordinary degree of concentration is reached over 60° Baumé, instead of 9°, as under the old process. I continue to pass the gaseous silicon fluoride into the liquid until all the hydrofluoric acid (HF) originally added is converted into $H_2SiF_6$ and slight excess of silica remains in the acid, thus enabling it to be easily transported in glass and earthenware vessels. Otherwise, if free fluoric acid were allowed to remain in the liquid it would attack the silicious material of the vessel and destroy it.

By my invention I am enabled to avoid the difficuly mentioned and produce an acid of a degree of strength and purity at present unknown in commerce, thus converting what was formerly an obstruction and danger into a positive advantage.

The amount of the solvent added varies according to the degree of concentration required. In practice I find from ten per cent. to twelve per-cent. of hydrofluoric acid (HF) in proportion to the weight of water in the receiver sufficient for producing acid of a density of about 34° Baumé.

When an acid is required not strictly free from uncombined hydrofluoric acid, (HF,) the process may be stopped a little before this point is reached. This is a much more economical process than the old one above described. In the method of dissolving silica ($SiO_2$) in hydrofluoric acid, inasmuch as the fluoric acid has to be first distilled and then further treated with pulverized silica until it is nearly saturated, which is a practice extremely difficult, as the ordinary forms of silica are quite insoluble in water and with great difficulty in dilute hydrofluoric acid, which is the condition which results when the acid is nearly saturated with silica. This difficulty does not occur in my improved method, as the silica which then separates in its gelatinous and most soluble form is in such a peculiar condition that it will dissolve not only in very dilute hydrofluoric acid, but is even soluble in water, thus insuring the removal of the last traces of hydrofluoric acid (HF) and rendering transportation in glass and earthenware vessels possible. In the improved method the hydrofluosilicic acid is obtained by one distillation.

The advantages of my invention will be apparent to those skilled in the art. Concentrated acids have special powers. Thus without a very concentrated sulphuric and nitric acid nitro-glycerine cannot be made. Without an alcohol almost entirely free from water iodide of ethyl and many ethers cannot be produced. The distillation by this method is simple, easy, and unattended with danger. No mercury trapping is required.

My improved acid is applicable for all uses to which hydrofluosilicic acid is generally employed, and is especially used in the treatment or defecation of beet-root sugar, the same acting on the potash contained therein and removing it as fluosilicate of potash.

I claim as my invention—

1. The herein-described process of producing hydrofluosilicic acid, which consists in passing fluoride of silicon into an aqueous solution of hydrofluoric acid in the presence of a free soluble acid.

2. The herein-described process of producing hydrofluosilicic acid, which consists in passing fluoride of silicon into an aqueous solution containing free hydrofluoric acid, during the presence of which the silica is dissolved, as set forth.

In testimony whereof I affix my signature in presence of two witnesses.

THOMAS WM. CAPPON.

Witnesses:
J. NOTA MCGILL,
WM. S. HODGES.